United States Patent Office 3,793,286
Patented Feb. 19, 1974

3,793,286
RESIN SYSTEM BASED ON FURFURYL ALCOHOL AND HALOMETHYLATED PHENOLICS
Kenneth C. Petersen and Lewis H. Bowers, Scotia, and John L. Sullivan, Burnt Hills, N.Y., assignors to Schenectady Chemicals, Inc., Schenectady, N.Y.
No Drawing. Filed Nov. 18, 1971, Ser. No. 200,175
Int. Cl. C08g 51/04
U.S. Cl. 260—38
16 Claims

ABSTRACT OF THE DISCLOSURE

Highly halomethylated heat reactive phenols are employed as hardeners for furfuryl alcohol resins. The furfuryl alcohol can be modified by urea or phenol-formaldehyde resins. The products are useful as binders in the foundry industry.

---

The present invention relates to novel furfuryl alcohol resin compositions.

It has been found that highly halomethylated heat reactive phenols (also called phenolic resins) are excellent hardeners for furfuryl alcohol containing resins, particularly for use as no bake resins in the foundry industry. These systems are superior to the currently known binder catalyst systems currently used in the foundry industry.

The highly halomethylated heat reactive resins are prepared by halogenating a phenol-formaldehyde reaction product to produce a material which may be represented by the formula

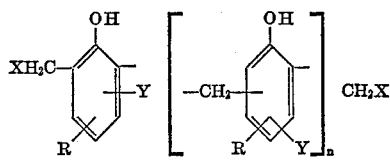

where $n$ is an integer from 0 to 20, usually not averaging over 4, R is alkyl, aryl or alkaryl having 4 to 20 carbon atoms located in one of the meta and para positions to the hydroxyl group, X is haolgen or hydroxyl with the proviso that at least one X is halogen, and Y is a halogen, hydrogen or hydroxyl, the halogens having an atomic weight of 35 to 127, i.e. they are chlorine, bromine or iodine, the resin having at least 9% halogen by weight and usually not over 30% although it can be as much as 60%. Preferably Y is hydrogen and X is alkyl of 4 to 16 carbon atoms.

These highly halogenated resins are old per se. Thus there can be used any of the halomethylated phenols or phenolic resins disclosed in Braidwood Pat. 2,972,600, Fusco Pat. 3,165,496, Fusco Pat. 3,218,286 and Berejka Pat. 3,597,377. The entire disclosure of these four patents is hereby incorporated by reference.

As set forth in Fusco Pat. 3,165,496, the halomethylated phenolic material is the reaction product of formaldehyde with a phenol having the formula

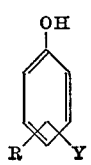

wherein R and Y are as defined above. The number of phenolic units in the product is $n+1$ where $n$ is an integer from 0 to 20.

Thus the halomethylated resins can be prepared by reacting hydrochloric acid, hydrobromic acid or hydroiodic acid with a resol prepared from formaldehyde and a phenol such as p-t-butyl phenol, p-t-octyl phenol, p-t-amyl phenol, p-dodecyl phenol, p-hexadecyl phenol, p-tetradecyl phenol, p-n-hexyl phenol, p-t-hexyl phenol, p-nonyl phenol, 5-pentadecyl resorcinol, p-benzyl phenol, 4-octyl phenol, p-phenyl phenol. Typical resins within the general formula are the following when $n$ is considered 0 for the purpose of establishing characteristic structures ($n$ is usually 2 to 10), are 2,6-dichloromethyl-4-t-butylphenol,
2,6-dichloromethyl-4-octylphenol,
2,6-dibromomethyl-4-octylphenol,
2,6-diodomethyl-4-dodecylphenol,
2,6-dichloromethyl-4-phenylphenol,
2,6-dibromomethyl-4-eicosanylphenol,
2,6-dibromomethyl-5-pentadecylphenol,
2,6-dibromomethyl-5-pentadecyl resorcinol,
2,6-dibromomethyl-3-bromo-4-t-butylphenol.

The halomethylated resin is normally used in an amount of 5 to 75% generally at least 10% and preferably 20 to 40% of the furfuryl alcohol resin. The furfuryl alcohol resin can be a pure furfuryl alcohol resin or furfuryl alcohol coreacted with formaldehyde or furfural, e.g., 5 to 30% of the weight of the furfuryl alcohol.

The furfuryl alcohol (with or without the aldehyde) is polymerized in conventional fashion using acid catalysts such as mineral acids, e.g. phosphoric acid, sulfuric acid, hydrochloric acid or hydrobromic acid, organic carboxylic and sulfonic acids, e.g. p-toluene sulfonic acid, benzene sulfonic acid, acetic acid, maleic acid, trichloroacetic acid, oxalic acid, acid reacting salts, e.g. ammonium chloride, p-toluene sulfonyl chloride, ferric chloride, aluminum chloride.

There can also be added urea and/or urea-formaldehyde or phenol-formaldehyde resins as is conventional in the foundry art in an amount of up to 60% of the total resin, e.g., 1 to 60%.

As fillers in making foundry cores, there can be used sand alone or admixed with zircon sand, aluminum oxide grit, graphite, asbestos or wood flour. In place of sand other conventional foundry core refractories can be used.

The furfuryl alcohol containing resin binder can be 1 to 5% of the refractory, e.g. foundry sand, preferably 1.5 to 2.5% of binder.

The use of furfuryl alcohol resins per se with or without urea-formaldehyde or phenol-formaldehyde resins of course is conventional in the art, see for example Sekera Pat. 3,549,584; Brown Pat. 3,020,609; Dunn Pat. 3,059,-297; Brown Pat. 3,216,075; Case Pat. 3,312,650; Singer Pat. 3,222,315; Watson Pat. 3,205,191; Buell Pat. 3,247,-556; Blaies Pat. 3,008,205; Freeman Pat. 3,024,215; Blaies Pat. 3,057,026; Kottke Pat. 3,145,438; Brown Pat. 3,184,-814; Zusman Pat. 3,485,288; Greenewald Pat. 3,550,670.

The novelty in the present invention is the particular hardener employed which in turn gives improved properties.

For handling purposes minor amounts of solvents, e.g. toluene or xylene can be utilized to reduce the viscosity of the halomethyl phenolic resin.

Unless otherwise indicated all parts and percentages are by weight.

As used in the present specification and claims the term "core" is used in its generic sense to mean a casting form which includes both molds and cores, thus see Sekera Pat. 3,549,584.

EXAMPLE 1

| | Parts |
|---|---|
| (A) Furfuryl alcohol | 299 |
| (B) UF 25/60 [1] | 233 |
| (C) Urea | 66 |
| (D) 28% phosphoric acid | 0.9 |
| (E) 10% sodium hydroxide | 1.0 |
| (F) Furfuryl alcohol | 400 |

[1] Commercial urea-formaldehyde product of E. I. du Pont de Nemours & Co., Inc., from urea and formaldehyde with a weight ratio of 25% urea, 60% formaldehyde and 15% water.

Components (A) through (D) were loaded into a reaction vessel set for reflux. The components were heated to atmospheric reflux (100° C.) and held for 2 hours. Heat was removed, then (E) and (F) were added. The batch was then cooled to 25° C.

Viscosity=A⁻ (Gardner-Holdt)
Sp. gr.=1.18

EXAMPLE 2

| | Parts |
|---|---|
| (A) Furfuryl alcohol | 980 |
| (B) Phenol | 188 |
| (C) Paraformaldehyde (91%) | 240 |
| (D) 28% phosphoric acid | 5 |
| (E) 10% sodium hydroxide | 5 |
| (F) Urea | 59 |
| (G) Furfuryl alcohol | 422 |

Materials (A) through (D) were loaded into a reaction vessel set for reflux. The materials were heated to atmospheric reflux in 1 hour. The batch was held at reflux (105° C.) for four hours then (E) and (F) were added. The resin was then vacuum distilled under 26 inches of vacuum to 80° C. Material (G) was added at 80° C. and the resin was cooled to 25° C.

Viscosity=G–H
Sp. gr.=1.18

EXAMPLE 3

| | Parts |
|---|---|
| (A) Furfuryl alcohol | 1000 |
| (B) 37% formaldehyde (uninhibited) | 490 |
| (C) 28% phosphoric acid | 5 |
| (D) 10% sodium hydroxide | 10 |
| (E) Urea | 60 |
| (F) Furfuryl alcohol | 900 |

Materials (A) through (C) were loaded into a reaction vessel set up for reflux. The temperature was brought to reflux (100° C.) and held for two hours. The heat was removed and then materials (D) and (E) were added. The resin was distilled under 26 inches of vacuum to 80° C. then (F) was added and the resin was cooled to 25° C.

Viscosity=A–B
Sp. gr.=1.17

EXAMPLE 4

| | Parts |
|---|---|
| (A) Furfuryl alcohol | 1000 |
| (B) Paraformaldehyde (91%) | 200 |
| (C) 28% phosphoric acid | 5 |
| (D) 10% sodium hydroxide | 10 |

Materials (A) through (C) were loaded into a reaction vessel set for atmospheric reflux. The materials were heated to reflux (105° C.) and held for two hours. At the end of two hours the resin was cooled to room temperature and (D) was added.

Viscosity=A⁻
Sp. gr.=1.19

EXAMPLE 5

| | Parts |
|---|---|
| (A) Furfuryl alcohol | 1000 |
| (B) 28% phosphoric acid | 5 |
| (C) 10% sodium hydroxide | 10 |

Materials (A) and (B) were loaded into a reaction vessel set for reflux. The materials were heated to atmospheric reflux (105° C.) and held for 2 hours. At the end of 2 hours the resin was cooled to room temperature and (C) was added.

Viscosity=A⁻
Sp. gr.=1.17

EXAMPLE 6

The components and procedure are the same as in Example 1 except the batch was distilled at the end of the condensation reaction (before the final addition of furfuryl alcohol) to 80° C. under 25 inches of vacuum.

Viscosity=C

EXAMPLE 7

(Preparation of phenolic condensate)

| | Parts |
|---|---|
| (A) Para tertiary butyl phenol | 1125 |
| (B) 37% formaldehyde (uninhibited) | 1250 |
| (C) 50% sodium hydroxide | 300 |
| (D) Toluene | 600 |

Materials (A) and (B) were loaded into a reaction vessel set for reflux. Material (C) was added to the reaction vessel at such a rate as to maintain a temperature below 50° C. (a cooling bath was necessary). After all of (C) was added, the reaction vessel was maintained at room temperature with agitation for 12 hours. At the end of 12 hours the reaction mixture was carefully neutralized to a pH of 4-5 with 20% hydrochloric acid. Material (D) was then added the mixture was mixed well and then allowed to separate. After complete separation the water layer was removed.

Solids=72%

EXAMPLE 8

(Preparation of phenolic condensate)

| | Parts |
|---|---|
| (A) Para tert. octyl phenol | 1200 |
| (B) 37% formaldehyde (uninhibited) | 1042 |
| (C) 50% sodium hydroxide | 373 |
| (D) Toluene | 100 |

The procedure was the same as in Example 7.

Solids=72%

EXAMPLE 9

| | Parts |
|---|---|
| (A) Condensate of Example 7 | 960 |
| (B) Toluene | 320 |
| (C) Versene $Fe^{+3}$ specific | 20 |
| (D) 48% hydrobromic acid | 570 |

NOTE.—Versene Fe specific is the monosodium salt of N,N'-dihydroxyethyl glycine, made by the Dow Chemical Co.

Materials (A) through (C) were added to a reaction vessel set for vacuum azeotropic distillation. Material (D) was added over a ten-minute period. After all of material (D) was in, the water was azeotropically removed under full vacuum of 26 inches. The resulting product was distilled under vacuum to a solids of 75%.

EXAMPLE 10

| | Parts |
|---|---|
| (A) Condensate of Example 7 | 453 |
| (B) Toluene | 300 |
| (C) Versene $Fe^{+3}$ specific | 9 |
| (D) 47% hydroiodic acid | 420 |

The procedure was the same as in Example 9.

EXAMPLE 11

| | Parts |
|---|---|
| (A) Condensate of Example 8 | 496 |
| (B) Toluene | 300 |
| (C) Versene $Fe^{+3}$ specific | 9 |
| (D) 48% hydrobromic acid | 338 |

The procedure was the same as in Example 9.

EXAMPLE 12

| | Parts |
|---|---|
| (A) Condensate of Example 8 | 430 |
| (B) Toluene | 300 |
| (C) Versene $Fe^{+3}$ specific | 8 |
| (D) 48% hydrobromic acid | 71 | of hardener (prepared in Example 9) were added to the resin-sand-mixture and mixed at slow speed for an additional 2 minutes. This same mix procedure was repeated substituting 12 grams of 85% phosphoric acid for the catalyst for each resin. Several one inch standard dogbone tensile specimens were prepared from each mix and allowed to cure at ambient temperatures for the below indicated times, from which the following data was obtained. As can be seen from Table 1, the resins of Examples 1 through 6, when catalyzed and coreacted with the resin of Example 9, give both a better cure rate and also develop higher ultimate tensile strengths than the phosphoric acid catalyzed control resins.

TABLE 1

| Resin | Ex. 1 | | Ex. 2 | | Ex. 3 | | Ex. 4 | | Ex. 5 | | Ex. 6 | |
|---|---|---|---|---|---|---|---|---|---|---|---|---|
| Catalyst | 85% $H_3PO_4$ | Ex. 9 | 85% $H_3PO_4$ | Ex. 9 | 85% $H_3PO_4$ | Ex. 9 | 85% $H_3PO_4$ | Ex. 9 | 85% $H_3PO_4$ | Ex. 9 | 85% $H_3PO_4$ | Ex. 9 |
| Tensile (p.s.i.): | | | | | | | | | | | | |
| 2 hr | 0 | 200 | 90 | 110 | 0 | 240 | 60 | 150 | 20 | 40 | 140 | 110 |
| 4 hr | 30 | 240 | 180 | 380 | 20 | 500 | 200 | 350 | 70 | 100 | 160 | 190 |
| 24 hr | 340 | 350 | 350 | 410 | 400 | 500 | 220 | 350 | 130 | 175 | 220 | 245 |
| Scratch hardness: | | | | | | | | | | | | |
| 2 hr | 0 | 55 | 85 | 92 | 0 | 95 | 92 | 85 | 0 | 78 | 68 | 88 |
| 4 hr | 78 | 83 | 88 | 92 | 60 | 95 | 92 | 85 | 83 | 88 | 78 | 88 |
| 24 hr | 88 | 83 | 88 | 95 | 87 | 95 | 93 | 85 | 86 | 88 | 78 | 90 |

Note.—The Scratch hardness test is performed according to Page 151 of Harry W. Dietert's book on Foundry Core Practice, published by the American Foundrymen Society, Des Plaines, Illinois, Third Ed. 1966.

Procedure was the same as in Example 9.

EXAMPLE 13

| | Parts |
|---|---|
| (A) Condensate of Example 8 | 425 |
| (B) Toluene | 300 |
| (C) Versene $Fe^{+3}$ specific | 8 |
| (D) 48% hydrobromic acid | 160 |

The procedure was the same as in Example 9.

EXAMPLE 14

| | Parts |
|---|---|
| (A) Condensate of Example 7 | 610 |
| (B) Toluene | 600 |
| (C) Versene $Fe^{+3}$ specific | 11 |
| (D) 48% hydrobromic acid | 212 |

The procedure was the same as in Example 9.

EXAMPLE 15

| | Parts |
|---|---|
| (A) Condensate of Example 7 | 610 |
| (B) Toluene | 600 |
| (C) Versene $Fe^{+3}$ specific | 11 |
| (D) 48% hydrobromic acid | 284 |

The procedure was the same as in Example 9.

EXAMPLE 16

| | Parts |
|---|---|
| (A) Condensate of Example 7 | 610 |
| (B) Toluene | 600 |
| (C) Versene $Fe^{+3}$ specific | 11 |
| (D) 48% hydrobromic acid | 354 |

The procedure was the same as in Example 9.

EXAMPLE 17

| | Parts |
|---|---|
| (A) Condensate of Example 7 | 610 |
| (B) Toluene | 600 |
| (C) Versene $Fe^{+3}$ specific | 11 |
| (D) 48% hydrobromic acid | 425 |

The procedure was the same as in Example 9.

EXAMPLE 18

Each of the resins in Examples 1 through 6 were evaluated according to the following process. About 3000 grams of Wedron 7020 silica sand was loaded into a Hobart mixer along with 60 grams of resin. The resin was mixed with the sand at low speed for 2 minutes. Twelve grams

EXAMPLE 19

The resin described in Example 1 and the hardener described in Example 9 were used to evaluate the effect of various levels of hardener on binder.

The mix and testing procedure described in Example 18 was used, the level of hardener being varied. The results are set forth in Table 2.

TABLE 2

| Percent hardener based on resin content | 2 | 5 | 10 | 20 | 30 | 40 | 50 | 75 | 20%-(85% $H_3PO_4$) |
|---|---|---|---|---|---|---|---|---|---|
| Tensile, p.s.i.: | | | | | | | | | |
| 1 hr | 0 | 0 | 0 | 0 | 95 | 165 | 165 | 42 | 0 |
| 2 hr | 0 | 0 | 0 | 90 | 210 | 180 | 200 | 70 | 0 |
| 4 hr | 0 | 0 | 0 | 180 | 235 | 250 | 210 | 150 | 55 |
| 24 hr | 0 | 0 | 180 | 355 | 480 | 465 | 255 | 255 | 340 |
| Scratch hardness: | | | | | | | | | |
| 1 hr | 0 | 0 | 0 | 0 | 58 | 80 | 80 | 60 | 0 |
| 2 hr | 0 | 0 | 0 | 70 | 62 | 88 | 84 | 68 | 0 |
| 4 hr | 0 | 0 | 0 | 88 | 78 | 90 | 86 | 80 | 75 |
| 24 hr | 0 | 0 | 75 | 90 | 85 | 92 | 86 | 82 | 88 |

EXAMPLE 20

The hardeners described in Examples 9 and 10 and 85% phosphoric acid were evaluated with the resin described in Example 1 according to the procedure described in Example 18. The results are set forth in Table 3.

TABLE 3

| Calytast | Ex. 9 | Iodinated PTBP condensate Ex. 10 | 85% $H_3PO_4$ |
|---|---|---|---|
| Tensile, p.s.i.: | | | |
| 2 hr | 42 | 90 | 0 |
| 4 hr | 305 | 180 | 55 |
| 24 hr | 370 | 350 | 340 |
| Scratch hardness: | | | |
| 2 hr | 70 | 70 | 0 |
| 4 hr | 82 | 88 | 75 |
| 24 hr | 92 | 90 | 88 |

EXAMPLE 21

The hardeners described in Examples 9, 12, 13, 14, 15, 16 and 17 along with 85% phosphoric acid were evaluated with the resin described in Example 1 using the mix and test procedure described in Example 18. The results are set forth in Table 4.

TABLE 4

| Hardener | Ex. 9 | Ex. 12 | Ex. 13 | Ex. 14 | Ex. 15 | Ex. 16 | Ex. 17 | 85% H₃PO₄ |
|---|---|---|---|---|---|---|---|---|
| Tensile, p.s.i.: | | | | | | | | |
| 2 hr | 200 | 0 | 0 | 0 | 100 | 270 | 320 | 0 |
| 4 hr | 240 | 0 | 96 | 120 | 100 | 334 | 450 | 100 |
| 24 hr | 350 | 70 | 600 | 560 | 400 | 400 | 480 | 340 |
| Scratch hardness: | | | | | | | | |
| 2 hr | 55 | 0 | 0 | 0 | 55 | 50 | 50 | 0 |
| 4 hr | 83 | 0 | 90 | 50 | 85 | 85 | 87 | 78 |
| 24 hr | 83 | 50 | 90 | 85 | 87 | 85 | 87 | 78 |
| Approx. percent Br in hardener at 100% non-volatiles | 40 | 9 | 19 | 23 | 30 | 38 | 45 | |

What is claimed is:

1. A furfuryl alcohol resin composition containing as a hardener for the furfuryl alcohol resin a halomethylated phenolic material prepared by halogenating the reaction product of formaldehyde with a phenol having the formula

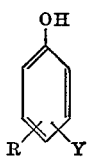

where the number of phenol units in the reaction product is $n+1$ where $n$ is an integer from 0 to 20, R is alkyl, aryl or alkaryl having 4 to 20 carbon atoms and located in one of the meta and para positions to the hydroxyl group, the halomethylated phenolic material having groups —CH₂X attached to a phenolic nucleus, X is halogen or hydroxyl, and Y is halogen, hydrogen or hydroxyl, all halogens in the hardener having an atomic weight of 35 to 127 and at least 9% of the hardener by weight being halogen.

2. A furfuryl alcohol resin composition according to claim 1 wherein R is alkyl of 4 to 16 carbon atoms and Y is hydrogen.

3. A composition according to claim 2 wherein $n$ has an average value of not over 3.

4. A composition according to claim 3 where X is bromine.

5. A composition according to claim 2 wherein the hardener is used in an amount of 5 to 75% of the furfuryl alcohol resin.

6. A composition according to claim 5 wherein the hardener is used in an amount of at least 10% of the furfuryl alcohol resin.

7. A composition according to claim 2 wherein the furfuryl alcohol resin is either a homopolymer or a copolymer with up to 30% of formaldehyde or furfural.

8. A composition according to claim 7 wherein there is present a urea-formaldehyde or phenol-formaldehyde resin in an amount of 1 to 60% of the total resin.

9. A cured foundry core comprising a foundry refractory material and the composition of claim 1 as a binder in an amount to provide 1 to 5% of resin based on the refractory.

10. A foundry core according to claim 9 wherein the refractory is sand.

11. A foundry core according to claim 10 wherein R is alkyl of 4 to 16 carbon atoms and Y is hydrogen.

12. A foundry core according to claim 11 where X is bromine.

13. A foundry core according to claim 12 wherein the hardener is used in an amount of 10 to 75% of the furfuryl alcohol resin.

14. A foundry core according to claim 13 wherein this furfuryl alcohol resin is either a homopolymer or a copolymer with up to 30% of formaldehyde or furfural.

15. A foundry core according to claim 14 wherein there is present a urea-formaldehyde or phenol-formaldehyde resin in an amount of 1 to 60% of the total resin.

16. A cured foundry core according to claim 9 wherein the curing is at ambient temperature.

References Cited

UNITED STATES PATENTS

| 2,399,055 | 4/1946 | Nordlander | 260—67 FA X |
| 3,299,167 | 1/1967 | Knowlson et al. | 260—829 |
| 3,057,026 | 10/1962 | Blaies et al. | 260—829 X |
| 3,165,496 | 1/1965 | Fusco et al. | 260—59 |
| 2,972,600 | 2/1961 | Braidwood | 260—623 D X |
| 3,151,096 | 9/1964 | Kordzinski et al. | 260—623 D X |

MORRIS LIEBMAN, Primary Examiner

S. M. PERSON, Assistant Examiner

U.S. Cl. X.R.

164—43; 260—37 R, 39 SB, 41 A, 829, Dig. 40